United States Patent [19]

Poletti

[11] Patent Number: 5,119,706
[45] Date of Patent: Jun. 9, 1992

[54] MACHINE PROCESS FOR CHAMFERING OF PRECISION PIECES HAVING NON-LINEAR EDGES DEVICE THEREFOR

[75] Inventor: Joseph Poletti, Millstadt, Ill.

[73] Assignee: Ehrhardt Tool and Machine Company, Inc., St. Louis, Mo.

[21] Appl. No.: 479,053

[22] Filed: Feb. 12, 1990

[51] Int. Cl.$^5$ ............................................. B23D 7/16
[52] U.S. Cl. ..................................... 83/455; 83/460; 83/614
[58] Field of Search .................. 83/451, 455, 460, 614

[56]  References Cited

U.S. PATENT DOCUMENTS

| | | | |
|---|---|---|---|
| 3,995,522 | 12/1976 | Holliday | 83/451 X |
| 4,676,130 | 6/1987 | Nutt | 83/460 X |
| 4,850,579 | 7/1989 | Fisher | 83/451 X |
| 5,001,108 | 3/1991 | Jenkner | 83/451 X |
| 5,018,418 | 5/1991 | Nasu | 83/451 X |
| 5,022,300 | 6/1991 | Yamashita | 83/451 X |

Primary Examiner—Timothy V. Eley
Attorney, Agent, or Firm—Kalish & Gilster

[57]  ABSTRACT

A machine device and method for use thereof provides uniform, precision machined chamfers upon pieces of non-uniform shape. The device includes a longitudinal base for supporting and longitudinal fixing thereon a flat, flexible blank having opposing longitudinal edges at least one of which is non-linear and to be chamfered. A longitudinal platform provides a non-planar surface with which to clamp the blank against an opposing corresponding non-planar lower clamping surface, provided upon the longitudinal base, so as to flexibly deform the blank such that the non-linear longitudinal edge of the blank extends by a substantially equal distance at each point thereon from a planar machining path extending along the non-linear longitudinal edge of the clamped blank. A machine cutting device passes a straight-edged cutting tool along a planar cutting path for uniform chamferring of the non-linear edge of the blank.

13 Claims, 1 Drawing Sheet

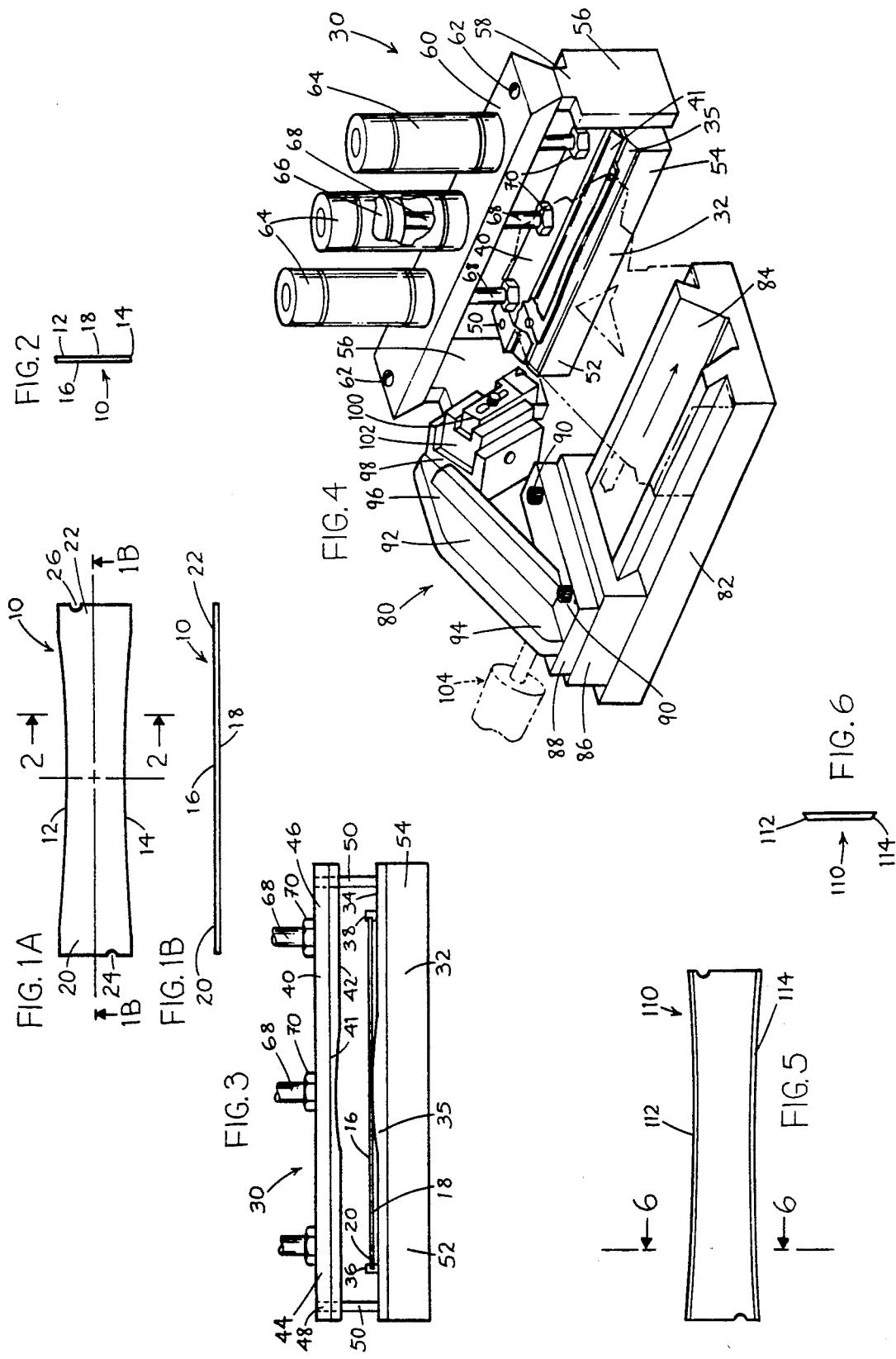

MACHINE PROCESS FOR CHAMFERING OF PRECISION PIECES HAVING NON-LINEAR EDGES DEVICE THEREFOR

BACKGROUND AND SUMMARY OF THE INVENTION

This invention relates generally to the field of machining edges of work pieces, and more particularly, to a novel and advantageous method of producing a uniform machine chamfered edge on work pieces having at least one non-linear longitudinal edge and the apparatus for carrying out the method.

In the nuclear energy industry it is necessary to use radioactive fuel rods which are held in bundles of parallel rods clamped together by metal bands or holders. These bundles of rods must be vertically submerged in coolant water. It is preferable that the band which wraps around a fuel rod bundle have a chamfered or angled edge so as to create less turbulence as the bundle is lowered vertically into the coolant. In order to properly manufacture such a fuel rod band it is necessary to start with a flat, metal blank which has non-linear (curved) longitudinal edges. However, in the conventional skiving process for machine cutting or chamfering a blank edge the cutting tool moves along a straight line such that skiving or chamfering of a non-linear edge will produce a final edge which is linear, albeit having the proper chamfered angle. Thereafter, in forming the fuel rod band, the blank is not of the proper form. That is, in order to meet finish component dimensional requirements after forming, the opposing, longitudinal edges of the flat metal blanks cannot be parallel at the time the chamfers are produced. Yet the conventional chamfering process itself produces such parallel longitudinal edges.

Accordingly, it is among the several objects of the present invention to provide a new machine apparatus and a process for using the new apparatus so as to produce nuclear fuel rod holders formed from flat longitudinal blanks having non-linear longitudinal edges such that the metal blanks so produced retain the original non-linear edge shape yet have a chamfered angle which is the same along the entire non-linear edge. It is intended that the apparatus be capable of use for chamfering a single non-linear longitudinal blank edge or of simultaneously chamfering both opposing edges of the blank when such edges are transversely, symmetrically irregular. It is further intended that the blank so chamfered will meet finished component dimensional requirements after forming of the edge.

In furtherence of these objects the present invention comprises, briefly, a machine device for providing uniform, precision chamfered edges upon flat pieces having a non-linear longitudinal edge. The device includes means for holding a flat, flexible blank having longitudinal edges, at least one of which edges is non-linear and to be machined so as to be chamfered, and means for longitudinally fixing the blank relative to the means for holding the blank. Means are provided for non-planar clamping the blank such that a non-linear longitudinal edge of the blank extends by a substantially equal distance at each point thereon into a planar machining path extending along the non-linear longitudinal edge. Further means are provided for linearly passing a straight-edged machine tool along the planar machining path in contact with the non-linear edge for precisely and uniformly machining the chamfer therealong.

It is also intended to accomplish the above objects by a machine process for providing at least one uniform, precision machined chamfers upon a flat piece having at least one non-linear longitudinal edge. The process includes providing a flat, flexible metal blank having two longitudinal edges, at least one such edge being non-linear and to be machined. The blank is placed upon a holding device such that a lower flat surface of the blank is adjacent to a non-planar lower clamping surface of the holding device. The blank is longitudinally fixed relative to the holding device and clamped between an upper clamping surface of the holding device and an opposed correspondingly non-planar lower clamping surface by flexibly deforming the blank between the opposed upper and lower clamping surfaces such that the at least one non-linear longitudinal edge of the blank extends by a substantially equal distance at each point thereon into a planar machining path extending along the non-linear longitudinal edge. A straight-edged machining tool is passed linearly along a planar cutting path in contact with the non-linear edge whereby precisely and uniformly to machine the chamfer therealong.

Other objects and features will be in part apparent and in part pointed out hereinbelow.

BRIEF DESCRIPTION OF THE DRAWINGS

FIG. 1A is a plan view of a non-uniform precision blank to be chamferred in accordance with the present invention.

FIG. 1B is a longitudinal sectional view of the blank of FIG. 1A taken on line 1B—1B.

FIG. 2 is a transverse sectional view of the blank of FIG. 1A taken on line 2—2.

FIG. 3 is a partial elevational view of the apparatus constructed in accordance with and embodying the present invention and having the blank of FIG. 1A positioned thereon.

FIG. 4 is a perspective view of the apparatus constructed in accordance with and embodying the present invention.

FIG. 5 is a top plan view of the blank of FIG. 1A after machine chamfering in accordance with the present invention.

FIG. 6 is a sectional view of the blank of FIG. 5 taken on line 6.

DESCRIPTION OF THE PREFERRED EMBODIMENT

Referring to the drawings, illustrated in FIGS. 1A, 1B and 2 and generally designated 10 is an uncut blank having non-linear longitudinal edges 12, 14. Blank 10 has flat upper 16 and lower 18 surfaces, as well as relatively straight first 20 and second ends 22 and is flexible. Preferably, arcuate notches 24, 26 are formed in ends 20, 22 respectively.

Blank 10 will most probably be formed of metal, preferably a zirconuim alloy or a nickel alloy, but may conceivably be of some other new synthetic material.

For uniform chamfering of non-linear edges 12, 14 blank 10 is placed in holding device 30 (shown in open position in FIG. 3 and in closed position in FIG. 4) such that lower flat surface 18 rests against the upper surface 34 of longitudinal base 32 which surface 34 provides a lower support surface for blank 10 and arcuate notches 24, 26 fit snuggly around alignment pegs 36, 38 respectively. So positioned, the upper surface 16 of blank 10 faces the lower surface 42 of a clamping plate 40 (referred to hereafter as upper clamping surface 42). Ends 44, 46 of clamping 40 define through-holes 48 for passage therethrough of guide pins 50 projecting vertically from ends 52, 54 of longitudinal base 32 for ensuring accurate alignment of the longitudinal plate as it is clamped upon the blank positioned on the longitudinal base.

FIG. 4 illustrates (for example) legs 56 which rise vertically, adjacent to each end 52, 54 of longitudinal base 32 and terminated upwardly in a neck portions 58 for support of platform 60 secured thereto by machine screws 62. Platform 60 supports fluid cylinders 64 positioned vertically thereon; preferably three in number and spaced uniformly along the length thereof. Cylinders 64 each house a piston 66 connected to a piston rod 68 which travels through a hole (not shown) in platform 60 and terminates in a nut 70 for preferably horizontal, longitudinal connection thereto of clamping plate 40. Cylinders 64 are ideally of the pneumatic type, but may also be hydraulic.

Positioned parallel to holding device 30 is conventional machine tool or cutting device generally designated 80. A longitudinal base 82 of cutting device 80 is positioned substantially adjacent and parallel to the longitudinal base 32 of holding device 30. Base 82 defines a linear longitudinal track 84 for slideable travel thereon of conveyor 86 (see arrow FIG. 4). A stage 88 is adjustably attached to conveyor 86 as by machine screws 90. An angled beam 92 is fixed to stage 88 at a lower end 94 thereof such that an upper end 96 is directed toward holding device 30. A block-like arm 98 having a U-shaped cross section is fixed to end 96 of beam 92 and angles downward therefrom. A straight edged cutting tool 100 is adjustably mounted within a carrier 102 which is likewise mounted within the U of arm 98. A conventional fluid cylinder 104 (shown in phantom, FIG. 4) is positioned rearwardly of conveyor 86 for linearly propelling the conveyor and thus passing cutting tool 100 along a planar cutting path formed by longitudinal edges 35, 41 of longitudinal base 32 and clamping plate 40 respectively, as shown in FIG. 4; thus producing a uniform chamfer along the entire non-linear edge, such as 114 of chamfered blank 110 (FIGS. 5 and 6).

In use, holding device 30 may be used with either one or two cutting devices 80 in order to chamfer either one or both irregular (ie. non-linear) longitudinal edges, such as 12, 14. If edges 12, 14 are symmetrically non-linear along a transverse axis (for example, the center transverse axis X, shown in FIG. 1A by a broken line) of blank 10 they may be simultaneously machined by using a cuttinq device 80 as previously described, on each side of holding device 30 at the same time. However, lack of tranversely symmetrical irregularity in longitudinal edges 12, 14 will require that each such edge be chamfered independently of the other. This is necessary because the lower surface 42 of clamping plate 40 (upper clamping surface) and upper surface 34 of longitudinal base 32 (lower clamping surface) must each have planar irregularities corresponding to the linear irregularities of the longitudinal blank edge to be chamfered.

Accordingly, clamping surfaces 34, 42 can not be formed to accommodate irregularities in both edges 12, 14 simultaneously unless the irregularities are transversely symmetrical. However, the irregularities need not be longitudinally symmetrical. That is, in order to simultaneously machine both edges 12, 14 blank 10 may have a surface shape such as being necked in at the center (as shown), having one end wider than the other, or blank 10 may widen and then narrow along its length; as long as in each case every point along edges 12, 14 is the same distance from the center longitudinal axis of blank 10 as its corresponding point on the opposite edge along a transverse axis. If, however, blank 10 would be seen in plan view to angle, such as if along the center transverse axis a point on edge 12 was closer to a centered longitudinal axis than the corresponding point on edge 14 along the same transverse axis, (this situation not shown) it would be impossible to simultaneously chamfer both edges 12 and 14. Thus, for example, if edges 12, 14 each have the same angle (curve) along a transverse axis, and in the same direction, edges 12, 14 must each be chamfered independently of the other. However, if edges 12, 14 are formed as shown in FIG. 1A, transversely symmetrical at central transverse axis X, they may be simultaneously chamfered by use (as hereafter described) of a cutting device 80 on each side of holding device 30. (For clarity, FIG. 4 shows only one such device in position.)

Therefore, to form from blank 10 a blank 110, having chamfered edges 112 and 114, it is necessary to place blank 110 upon longitudinal base 32 such that notches 24, 26 interconnect with alignment pegs 36, 38, respectively. So positioned, surfaces 16, 18 of blank 10 are facing clamping surfaces 42, 34 respectively. Surfaces 32, 34 bear irregularities of plane corresponding to those of non-linear edges 12, 14, preferably with surface 42 being concave and surface 34 being convex (shown exaggerated in FIG. 3 for clarity), although alternatively, surface 42 could be convex and surface 34 could be correspondingly concave.

Thus, when clamping plate 40 is propelled by pneumatic cylinder apparatuses 64, 66, 68, 70 over alignment pegs 50 which pass through holes 48, surface 42 will come in contact with surface 16 of blank 10 and force blank 10 to flex over the irregularity in surface 34 until surface 18 of blank 10 is in complete contact with surface 34 of longitudinal base 32. In such position non-linear edge 14 will extend by a substantially equal distance at each point thereon from (into) the aforesaid planar machining path formed by edges 41, 35 of clamping plate 40 and longitudinal base 32, respectively. Thereafter, cutting device 80 is positioned so that cutting tool 100 may pass along the linear cutting path when conveyor 86 is propelled along track 84 by preferably pnuematic fluid cylinder 104 to produce uniformly chamfered edge 114 on machined blank 110. Thereafter, blank 10 may be rotated 180° and repositioned on longitudinal base 32 for similar chamfering of edge 12 to produce edge 112. Or, alternatively, both such edges, in the example illustrated, may be chamfered simultaneously because the irregularities of non-linear edges 12, 14 are transversely symmetrical.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. A machine device for providing a uniform, precision chamfered edge upon flat pieces having a non-linear longitudinal edge, wherein the device comprises means for holding a flat flexible blank having opposing longitudinal edges at least one of which edges is non-linear and to be machined so as to be chamfered, means for longitudinally fixing the blank relative to the means for holding the blank, means for non-planar clamping of the blank such that a non-linear longitudinal edge of the blank extends by a substantially equal distance at each point thereon into a planar machining path extending along the non-linear longitudinal edge, and means for linearly passing a straight-edged machining tool along the machining path in contact with the non-linear edge for precisely and uniformly machining the chamfer along the non-linear edge while maintaining the non-linear character thereof.

2. The device according to claim 1, wherein the means for supporting a blank comprises a longitudinal base having first and second opposing ends and a non-planar upper surface for providing a non-planar lower clamping surface for supporting a flat, flexible metal blank having two opposing longitudinal edges, at least one of which longitudinal edges is non-linear and to be chamfered therealong.

3. The device according to claim 2, wherein the means for clamping the blank comprises first and second support members disposed adjacent to the longitudinal base at the respective first and second opposing ends thereof; a longitudinal platform, having first and second opposing ends fixed respectively upon the first and second support members parallel to and above the longitudinal base, at least one fluid cylinder assembly vertically disposed above the longitudinal platform and partially penetrating therethrough; and a longitudinal plate attached to the at least one fluid cylinder assembly at a lower end thereof and propelled thereby and having a non-planar underside for providing a non-planar upper clamping surface with which to clamp the blank against the opposing, correspondingly non-planar lower clamping surface so as to longitudinally flexibly deform the blank such that the non-linear longitudinal edge of the blank extends by a substantially equal distance at each point thereon into a planar machining path extending along the non-linear longitudinal edge.

4. The device according to claim 3, wherein the means for clamping the blank further comprises means for ensuring accurate alignment of the longitudinal plate as it is clamped upon the blank positioned on the longitudinal base.

5. The device according to claim 4, wherein the first and second opposing ends of the longitudinal plate define through holes, and the means for ensuring accurate alignment comprises guide pins vertically fixed at the first and second opposing ends of the longitudinal base in vertical alignment beneath the corresponding through holes of the longitudinal plate for penetration therethrough upon clamping of the blank.

6. The device according to claim 1, wherein the means for fixing the blank comprise keeper means at first and second opposing ends thereof for longitudinally and transversely maintaining the blank in a preselected position upon the means for holding the blank.

7. The device according to claim 6, wherein the keeper means comprise alignment pegs for fitting within preformed corresponding notches in the first and second opposing ends of the blank.

8. The device according to claim 1, wherein the means for linearly passing a straight-edged machining tool comprises at least one machine device having a longitudinal base disposed side-by-side in relation to the longitudinal base of the means for supporting a blank and defining a track along the longitudinal axis thereof, a slide assembly slideably mounted upon the longitudinal base for travel along the track, an elongated beam having first and second ends, the first end being fixed to the slide assembly and the second end being directed toward the holding device, a straight-edged machining tool removably adjustably attached to the second end of elongated beam and located in contact with the non-linear longitudinal edge of the blank, a fluid cylinder assembly for driving the slide assembly along the track such that the straight-edged machining tool passes linearly along the planar machining path in contact with at least one non-linear edge of the blank, whereby to precisely and uniformly machine the at least one non-linear edge along the length thereof.

9. The device according to claim 8, wherein there are two such machine devices, one positioned on each side of the holding device, for simultaneous machining of two transversely symmetrically non-linear longitudinal edges of the blank.

10. A machine device for providing uniform, precision chamfers along non-linear edges upon pieces with non-linear edges while using a linear traveling cutting tool, wherein the device comprises a holding device and at least one machine device; the holding device comprising:

a) a longitudinal base having first and second opposing ends and a non-planar upper surface for providing a lower clamping surface of the holding device for supporting a flat, flexible flank having two opposing longitudinal edges, at least one of which longitudinal edges is non-linear and to be chamfered;

b) first and second support members disposed vertically and longitudinally adjacent to the first and second opposing ends of the longitudinal base respectively;

c) a longitudinal platform, positioned parallel and horizontally above the longitudinal base, having first and second opposing ends fixed respectively upon the first and second support members;

d) at least one fluid cylinder assembly disposed above the longitudinal platform; and e) a longitudinal plate attached to the at least one fluid cylinder assembly so as to be positioned parallel to and beneath the longitudinal platform and propelled thereby and having a non-planar underside for providing a non-planar upper clamping surface with which to clamp the blank against the opposing, correspondingly non-planar lower clamping surface, to thereby, as a result of the corresponding curvature of the non-planar upper clamping surface and the non-planar lower clamping surface, flexibly deform the flat, flexible blank such that a non-linear longitudinal edge of the blank is parallel to and extends by a substantially equal distance at each point thereon into a planar machining path extending along the non-linear longitudinal edge; the machining device comprising:

a) a longitudinal base disposed side-by-side in relation to the longitudinal base of the holding device and defining a track along the longitudinal axis thereof;
b) a slide assembly slideably mounted upon the longitudinal base for linear travel along the track;
c) an elongated beam having proximal and distal ends, the proximal end being carried by the slide assembly and the distal end being directed toward the holding device;
d) a straight-edge machining tool moveably adjustably carried by the distal end of the elongated beam and located in edgewise contact with the non-linear longitudinal edge of the blank; and
e) a fluid cylinder assembly for driving the slide assembly along the track defined by the longitudinal base such that the straight-edged machining tool passes linearly along the cutting path in contact with the non-linear edge of the blank.

11. The device according to claim 10, wherein the fluid cylinder assembly comprises a plurality of fluid cylinder assemblies spaced uniformly, centrally along the length of the longitudinal platform for uniform distribution of pressure by the nonplanar upper clamping surface against the blank supported on the corresponding non-planar lower clamping surface of the clamping device.

12. The device according to claim 10, wherein the corresponding non-planar upper and lower clamping surfaces are longitudinal non-planar along a transverse axis at a point substantially halfway between the ends thereof for clamping a blank having at least one edge which is non-linear substantially halfway along the length thereof.

13. The device according to claim 10, wherein the corresponding non-planar upper and lower clamping surfaces are longitudinal non-planar along a transverse axis at a point substantially one-fourth the distance between the ends thereof for clamping a blank having at least one edge which is non-linear substantially one-fourth the distance along the length thereof.

* * * * *